Patented May 16, 1933

1,909,829

UNITED STATES PATENT OFFICE

ERNST JAENECKE, OF HEIDELBERG, GERMANY, ASSIGNOR TO I. G. FARBENINDUSTRIE AKTIENGESELLSCHAFT, OF FRANKFORT-ON-THE-MAIN, GERMANY

PRODUCTION OF FERTILIZER SALTS

No Drawing. Application filed January 3, 1930, Serial No. 418,438, and in Germany February 27, 1929.

The present invention relates to the production of fertilizer salts containing potash and nitrogen or potash, nitrogen and phosphorus.

I have found that potassium carbamate, which has recently become available by processes which are convenient to carry out in practice, is an excellent initial material for the manufacture and production of fertilizer salts, containing potash and nitrogen or potash, nitrogen and phosphorus. The process according to the present invention is carried out by treating the carbamate, either as such or in admixture, for example with other compounds containing nitrogen or with phosphates, preferably in the absence of substantial amounts of water, with a suitable quantity of an acid, preferably nitric acid or phosphoric acid. The corresponding acid salts may be employed instead of or preferably in addition to the acids. The corresponding neutral salts may also be added to the acids. It is thus possible to obtain directly very valuable mixed fertilizers or complete fertilizers of any desired composition by the suitable choice of the acids or salts and by employing suitable proportions. Any free acid or acid in the form of acid salts in the final product obtained may be removed or neutralized by treatment with agents having a basic action, such as ammonia. In particular primary ammonium phosphate may for example be converted into secondary ammonium phosphate.

The process according to the present invention may be carried out for example by introducing the solid carbamate into the acid, preferably while stirring.

The conversion for example with concentrated nitric acid proceeds in such a manner that a dry mixture of equimolecular quantities of $KNO_3$ and $NH_4NO_3$ is formed with the evolution of carbon dioxide. When phosphoric acid is present at the same time a double decomposition of the potassium phosphate formed and the ammonium nitrate takes place so that by the employment of suitable proportions it is possible directly to obtain the mixture:

$$KNO_3 + (NH_4)_2HPO_4.$$

Preferably the quantity of acid should be so large as to ensure that a complete conversion of the carbamate takes place. It is frequently preferable to add other compounds containing nitrogen, as for example urea, or other compounds containing phosphorus in addition to nitric and/or phosphoric acid or both in order to obtain products with the usual nutrient proportions of $K:N:P$, for example products containing $N$, $P_2O_5$ and $K_2O$ in the proportion of 1: 0.75 to 2:1 to 1.75. Acid salts, such as $KH_5(PO_4)_2$, may also be added.

The following examples will further illustrate the nature of this invention, but the invention is not restricted to these examples. The parts are by weight.

Example 1

198 parts of potassium carbamate are decomposed with a mixture of 196 parts of sulphuric acid and 264 parts of ammonium sulphate or with 460 parts of ammonium bisulphate, carbon dioxide being evolved. A product containing 14.7 per cent of $N$ and 16.4 per cent of $K_2O$ is obtained.

Example 2

99 parts of potassium carbamate are decomposed with a mixture of 98 parts of phosphoric acid and 63 parts of nitric acid. A product containing 13 per cent of $N$, 32.5 per cent of $P_2O_5$ and 21.5 per cent of $K_2O$ is obtained with the evolution of carbon dioxide.

Example 3

Gaseous ammonia is led through the product obtained according to Example 2. A product is thus obtained which contains 18 per cent of N, 30.5 per cent of $P_2O_5$ and 20 per cent of $K_2O$.

*Example 4*

198 parts of potassium carbamate are decomposed with a mixture of 98 parts of phosphoric acid, 126 parts of nitric acid and 40 parts of ammonium nitrate. The product obtained has a content of 19.2 per cent of N, 18.4 per cent of $P_2O_5$ and 25.2 per cent of $K_2O$.

What I claim is:—

1. The process of producing fertilizer salts which comprises decomposing solid potassium carbamate with an inorganic acid non-injurious to plants.

2. The process of producing fertilizer salts which comprises decomposing solid potassium carbamate with an inorganic acid and an inorganic acid salt non-injurious to plants.

3. The process of producing fertilizer salts which comprises decomposing solid potassium carbamate with an acid selected from the group consisting of nitric acid and phosphoric acid.

4. The process of producing fertilizer salts which comprises decomposing solid potassium carbamate with phosphoric acid.

5. The process of producing fertilizer salts which comprises decomposing solid potassium carbamate with phosporic acid and at least partly neutralizing the resulting product.

6. The process of producing fertilizer salts which comprises decomposing solid potassium carbonate with phosphoric acid and at least partly neutralizing the resulting product with ammonia.

7. The process of producing a fertilizing mixture which comprises decomposing solid potassium carbamate with an acid inorganic compound having a strong mineral acid anion and containing in combined form a plant nutrient selected from the class consisting of N, K and P.

8. The process of producing fertilizing salts which comprises decomposing solid potassium carbamate with a strong mineral acid.

9. The process of producing fertilizer salts which comprises decomposing solid potassium carbamate with a strong mineral acid and a salt of a strong mineral acid containing in combined form a plant nutrient selected from the class consisting of N, K and P.

10. The process of producing fertilizer salts which comprises decomposing solid potassium carbamate with phosphoric acid and nitric acid.

In testimony whereof I have hereunto set my hand.

ERNST JAENECKE.